(12) United States Patent
Younger (10) Patent No.: US 7,331,893 B2
(45) Date of Patent: Feb. 19, 2008

(54) METHODS AND SYSTEMS FOR IMPROVING THE OPERATION OF TRANSMISSIONS FOR MOTOR VEHICLES

(76) Inventor: Gilbert W. Younger, 2621 Merced Ave., El Monte, CA (US) 91733

( * ) Notice: Subject to any disclaimer, the term of this patent is extended or adjusted under 35 U.S.C. 154(b) by 202 days.

(21) Appl. No.: 11/206,931

(22) Filed: Aug. 18, 2005

(65) Prior Publication Data

US 2007/0042862 A1 Feb. 22, 2007

Related U.S. Application Data

(62) Division of application No. 10/693,055, filed on Oct. 24, 2003, now Pat. No. 6,964,628.

(51) Int. Cl.
*F16H 61/26* (2006.01)
(52) U.S. Cl. .................................................. 475/127
(58) Field of Classification Search ................ 475/127; 137/115.14
See application file for complete search history.

(56) References Cited

U.S. PATENT DOCUMENTS 6,712,726 B1 * 3/2004 Jackson et al. ............. 475/127
6,776,736 B1 * 8/2004 Stafford et al. ............. 475/127
6,832,632 B1 * 12/2004 Wallace ................. 137/625.66
2002/0082131 A1 * 6/2002 Park et al. .................. 475/127

* cited by examiner

*Primary Examiner*—Sherry Estremsky
*Assistant Examiner*—Edwin A Young
(74) *Attorney, Agent, or Firm*—Mark P. Stone (57) ABSTRACT

Methods and systems for improving the operation of a transmission for an automotive vehicle are provided for modifiying the original hydraulic circuits to increase the capacity or holding ability of the low and reverse clutches when the transmission is shifted into manual low gear to slow down a moving vehicle, to provide a quick and smooth apply of the low and reverse clutches when the driver selects manual low when the vehicle is moving at a relatively high road speed, and to permit the connection of two low hydraulic circuits to feed torque converter and cooler/lubrication circuits by application of relatively low fluid pressure to assure that the necessary pressure required to connect the circuits will be properly applied.

4 Claims, 6 Drawing Sheets

METHODS AND SYSTEMS FOR IMPROVING THE OPERATION OF TRANSMISSIONS FOR MOTOR VEHICLES

The present application is a divisional of application Ser. No. 10/693,055, filed on Oct. 24, 2003, now U.S. Pat. No. 6,964,628 and claims the benefit of the parent application pursuant to 35 U.S.C. Section 120.

BACKGROUND OF THE INVENTION

The methods and systems of the present invention are directed to the modification and improvement of transmissions for automotive vehicles of the type installed by the original equipment manufacturer, commonly referred to as the "factory installed" transmission.

The invention is particularly directed to improvement and modification of the automotive transmissions commonly known as the 4R100 installed in vehicles manufactured by the Ford Motor Company of Dearborn, Mich., and the E40D also installed in vehicles manufactured by the Ford Motor Company of Dearborn, Mich.

The present inventor owns the following United States patents, the disclosure of each of which is expressly incorporated by reference into the present application: U.S. Pat. No. 4,449,426, issued May 26, 1984; U.S. Pat. No. 4,711,140, issued Dec. 8, 1987; U.S. Pat. No. 4,790,938, issued Dec. 13, 1988; U.S. Pat. No. 5,253,549, issued Oct. 19, 1993; U.S. Pat. No. 5,540,628, issued Jul. 30, 1996; U.S. Pat. No. 5,624,342, issued Apr. 29, 1997; U.S. Pat. No. 5,730,685, issued Mar. 24, 1998; U.S. Pat. No. 5,743,823, issued Apr. 28, 1998; U.S. Pat. No. 5,768,953, issued Jun. 23, 1998; U.S. Pat. No. 5,820,507, issued Oct. 7, 1998; U.S. Pat. No. 5,967,928, issued Oct. 19, 1999; U.S. Pat. No. 6,099,429, issued Aug. 8, 2000; U.S. Pat. No. 6,117,047, issued Sep. 12, 2000; U.S. Pat. No. 6,287,231, issued Sep. 11, 2001; U.S. Pat. No. 6,390,944, issued May 21, 2002; and U.S. Pat. No. 6,565,472, issued May 20, 2003.

Applicant also owns the following pending U.S. patent applications: Ser. No. 10/081,605, filed Feb. 21, 2002; (now U.S. Pat. No. 6,871,397, issued Mar. 29, 2005); Ser. No. 10/105,674, filed Mar. 25, 2002; (now U.S. Pat. No. 6,699,157, issued Mar. 2, 2004); Ser. No. 10/348,846, filed Jan. 22, 2003; (now U.S. Pat. No. 6,729,989, issued May 4, 2004); Ser. No. 10/360,576, filed Feb. 7, 2003; (now U.S. Pat. No. 6,814,680, issued Nov. 9, 2004); and Ser. No. 10/678,924, filed Oct. 3, 2003 (now U.S. Pat. No. 6,913,554, issued Jul. 5, 2005).

The basic principles of the "factory installed" 4R100 automotive transmission, including the specific modes of operation thereof and the hyrdraulic circuits and interrelationship of hyrdraulic circuits, are well known to those in the automotive transmission art. Attention is respectfully invited to the operations manual and text entitled 4R100 Transmissions—Theory And Operation (2000), published by Ford Motor Company of Dearborn, Mich., said publication describing in detail the operation of the "factory installed" 4R100 automotive transmission, including a description of the structure, the hydraulic circuits, and the interrelationship between the structure and the hydraulic circuitry and fluid flow during normal operation of this "factory installed" transmission in automotive vehicles. The disclosure of the aforementioned publication in its entirety is expressly incorporated by reference into the disclosure of the present patent application as disclosing and illustrating background material known to those of ordinary skill in the automotive transmission art.

The basic principles of operation of the "factory installed" E40D transmission for automotive transmissions, including the specific modes of operation thereof and the hydraulic circuits and interrelationship of hydraulic circuits, are well known to those skilled in the automotive transmission art. Attention is respectfully invited to the operations manual and text entitled *E40D Automotive Transmission Reference Manual* (1992), published by Ford Motor Company of Dearborn, Mich., said publication describing in detail the operation of the "factory installed" E40D transmission, including a discussion of the structure, the hydraulic circuits, and the interrelationship between the structure and the hydraulic circuitry and fluid flow during normal operation of this "factory installed" transmission in automotive vehicles. The disclosure of the aforementioned publication in its entirety is expressly incorporated by reference into the disclosure of the present patent application as disclosing the illustrating background material known to those of ordinary skill in the automotive transmission art.

It is a primary objective of the present invention to increase the capacity or holding ability of the low and reverse clutches of the "factory installed" 4R100 and E40D transmissions when the transmission is shifted into manual low gear to slow the vehicle, as for example, when the vehicle is descending downhill. Heavy loaded vehicles may cause the low and reverse clutches of the "factory installed" transmissions to burn and fail rapidly when the transmissions are used under these conditions.

It is a further object of the present invention to provide a quick, but smooth, apply of the low and reverse clutches in the "factory installed" 4R100 and E40D transmissions when the driver selects manual low gear when the vehicle is travelling at a relatively high road speed. A rough apply may result in tire skidding, while a slow apply may result in a free-wheeling or neutral condition.

It is yet a further object of the present invention to modify the "factory installed" 4R100 and E40D transmissions to adjust the pressure required to move the pressure regulator valve into a position for applying fluid to the torque converter and cooler/lubrication circuits at a pressure less than that required by the "factory installed" transmissions. In the "factory installed" transmissions, a pressure of approximately 75 psi or higher must be applied to a pressure regulator valve by the output of a pressure pump to result in the flow of apply pressure to the torque converter and cooler/lubrication circuits. When the transmission is worn and/or leaks develop, the pump outlet cannot provide the necessary threshold pressure to feed the torque converter and cooler/lubrication circuits resulting in converter, bushing and gear failure as a result of lack of lubrication. By modifying the hydraulic circuitry of the "factory installed" transmission to require a significantly lower threshold pressure to feed the torque converter and cooler/lubrication circuits, the required apply pressure is provided notwithstanding worn components or leaks in the transmission.

Other objects and advantages of the improvements to the "factory installed" 4R100 and E40D automotive transmissions in accordance with the present invention will become apparent from the following discussion thereof in conjunction with the drawings.

SUMMARY OF THE INVENTION

The present invention provides methods and systems for modifying the hydraulic circuitry of a "factory installed" automotive transmission, and in particular the automotive transmissions designated as 4R100 and E40D by the Ford Motor Company. In accordance with a first aspect of the invention, the hydraulic circuitry of the "factory installed" transmissions is modified such that line pressure is initially applied to a 4-3-2 manual timing valve at full flow through a first hydraulic circuit for applying the fluid pressure to the low/reverse modulator valve until a predetermined pressure is attained, and thereafter fluid pressure is applied to the 4-3-2 manual timing valve through a second hydraulic circuit at a reduced flow rate until the fluid pressure applied to the low/reverse modulator valve attains a desired value. By switching the hydraulic circuit feeding the 4-3-2 manual timing valve from full flow below a predetermined pressure value to a reduced flow when the predetermined pressure value is attained, pressure is applied to the low/reverse modulator valve and the low and reverse clutches quickly but smoothly when the driver of the vehicle shifts the transmission into a manual low gear position when the vehicle is being driven at a relatively high road speed. In this manner, a rough apply, which could result in tire skidding, and a slow apply, which can result in a free-wheeling or neutral condition of the vehicle, is avoided. Additionally, the capacity or holding ability of the low and reverse clutches is increased to assist the vehicle when the transmission is placed in manual low to slow the vehicle, as for example, when the vehicle is descending downhill. The boost valve acting on the low/reverse modulator valve of the "factory installed" transmission is provided with a larger diameter, thereby enabling the new boost valve to apply a greater pressure to the low/reverse modulator valve and thus to the low and reverse clutches, than is possible with the "factory installed" transmission.

In a further aspect of the invention, the "factory installed" transmissions are modified so that a lower apply fluid pressure is capable of moving the pressure regulator valve to apply fluid to the torque converter and the cooler/lubrication circuits. In this manner, older transmissions with worn components or leaks, which otherwise would not be capable of applying sufficient pressure to the pressure regulator valve to feed the torque converter and cooler/lubrication circuits, are modified so that significantly less fluid pressure is necessary to feed the torque converter and cooler/lubrication circuits. This modification is accomplished by providing a new spring seat on the pressure regulator valve mounted to an existing casting for permitting the pressure regulator valve to move a predetermined distance necessary to feed the torque converter cooler/lubrication circuits before the pressure regulator valve engages the seat, such movement of the pressure regulator valve being accomplished by the application of less apply fluid pressure than required by the "factory installed" transmission. In this manner, converter, bushing and gear failure as a result of lack of lubrication resulting from the failure of the "factory installed" transmission to apply the requisite fluid pressure to feed the converter and cooler/lubrication circuits, is avoided.

DESCRIPTION OF THE BEST MODES FOR CARRYING OUT THE INVENTION

Figure 1A:
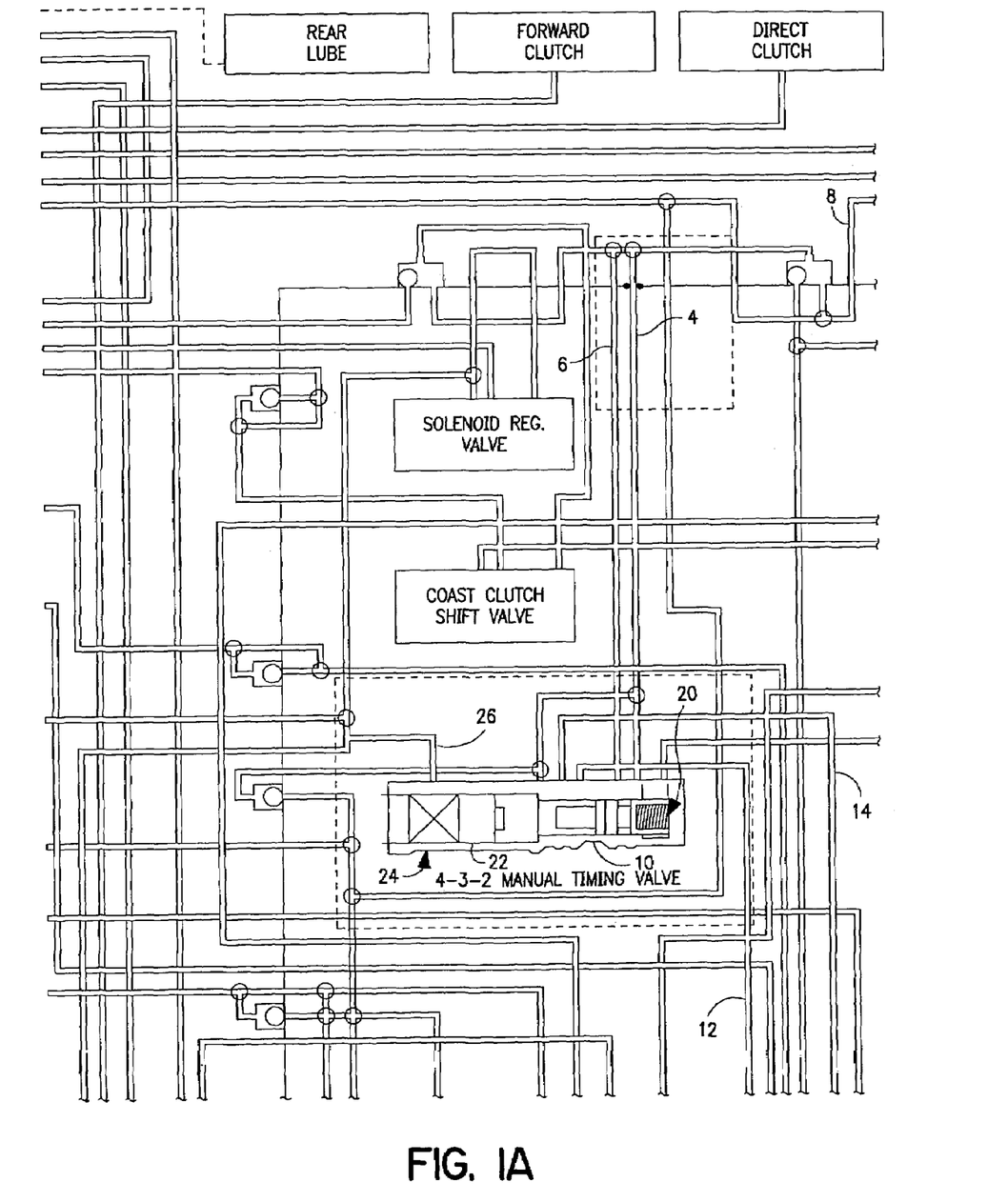
FIGS. 1A-1D illustrate the hydraulic circuitry of a 4R100 automotive transmission, as modified in accordance with the present invention.
Figure 1B:
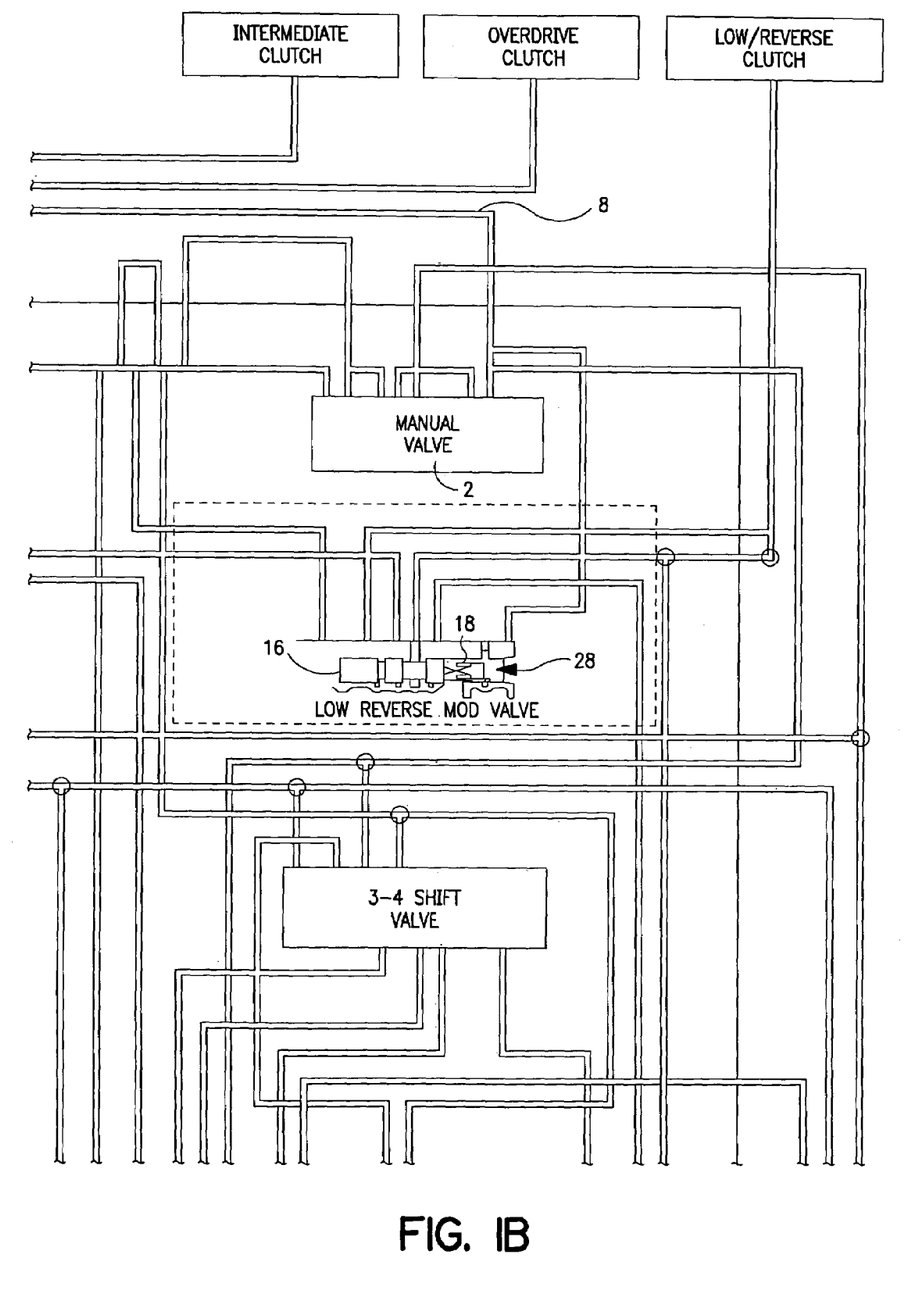
Figure 1C:
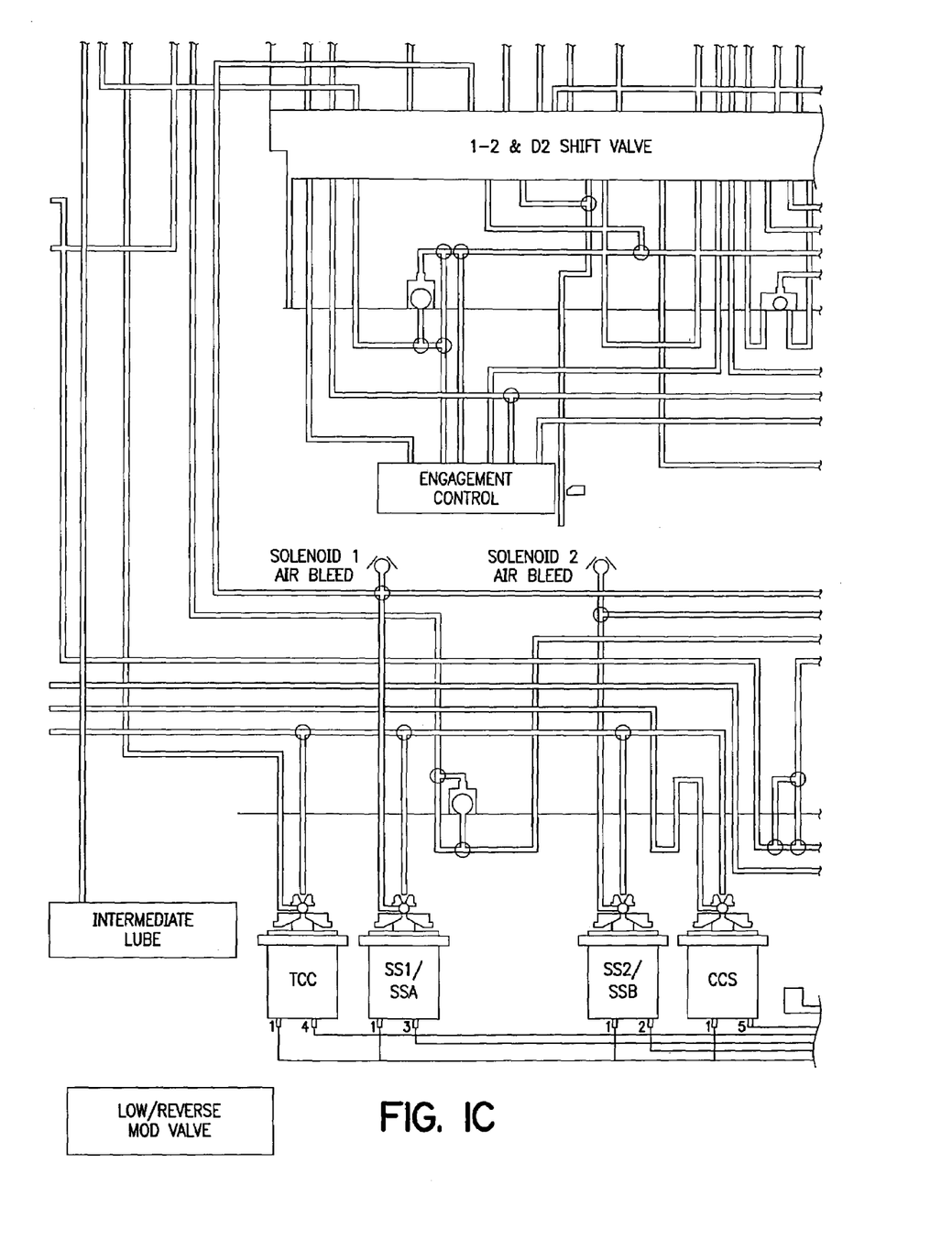
Figure 1D:
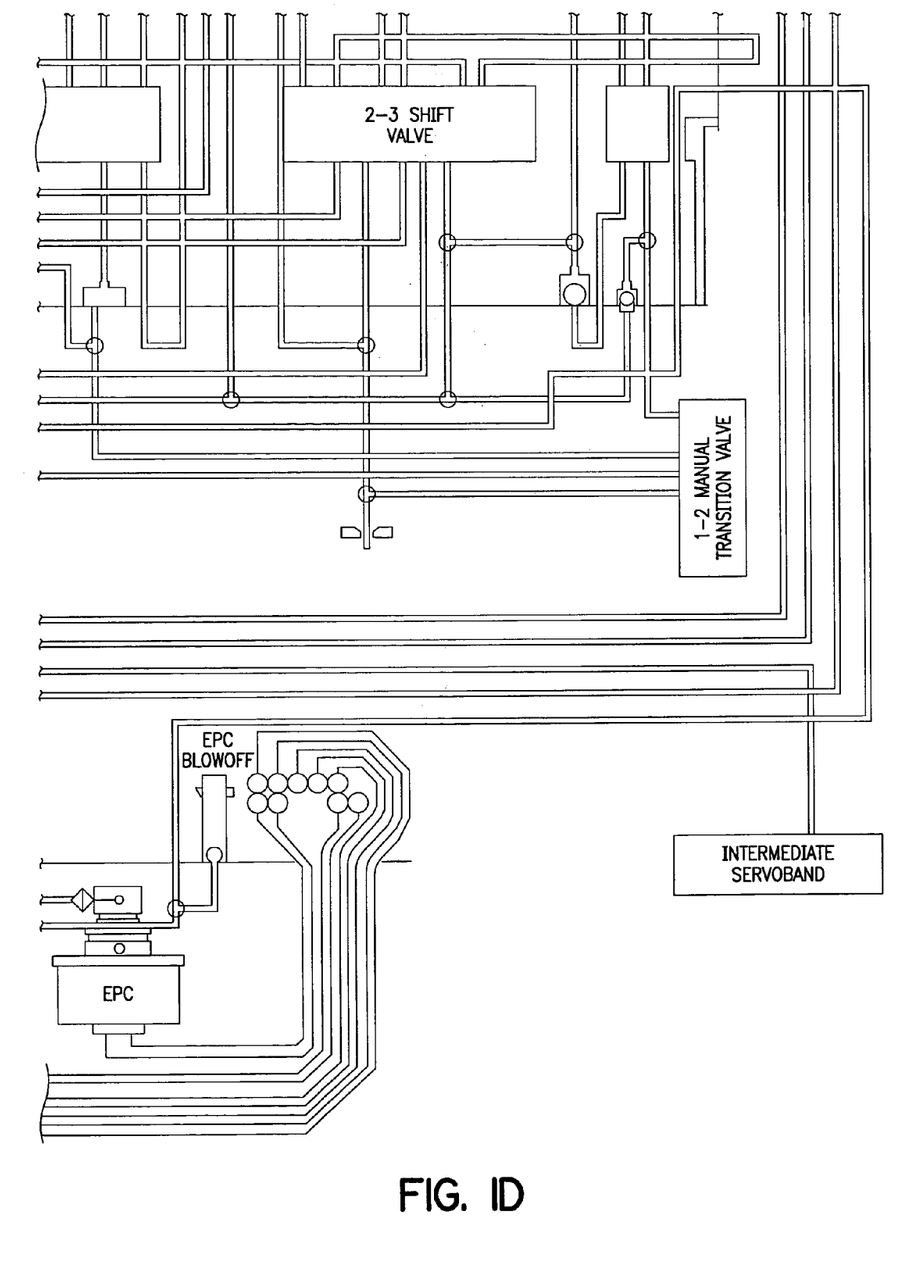
Figure 2:
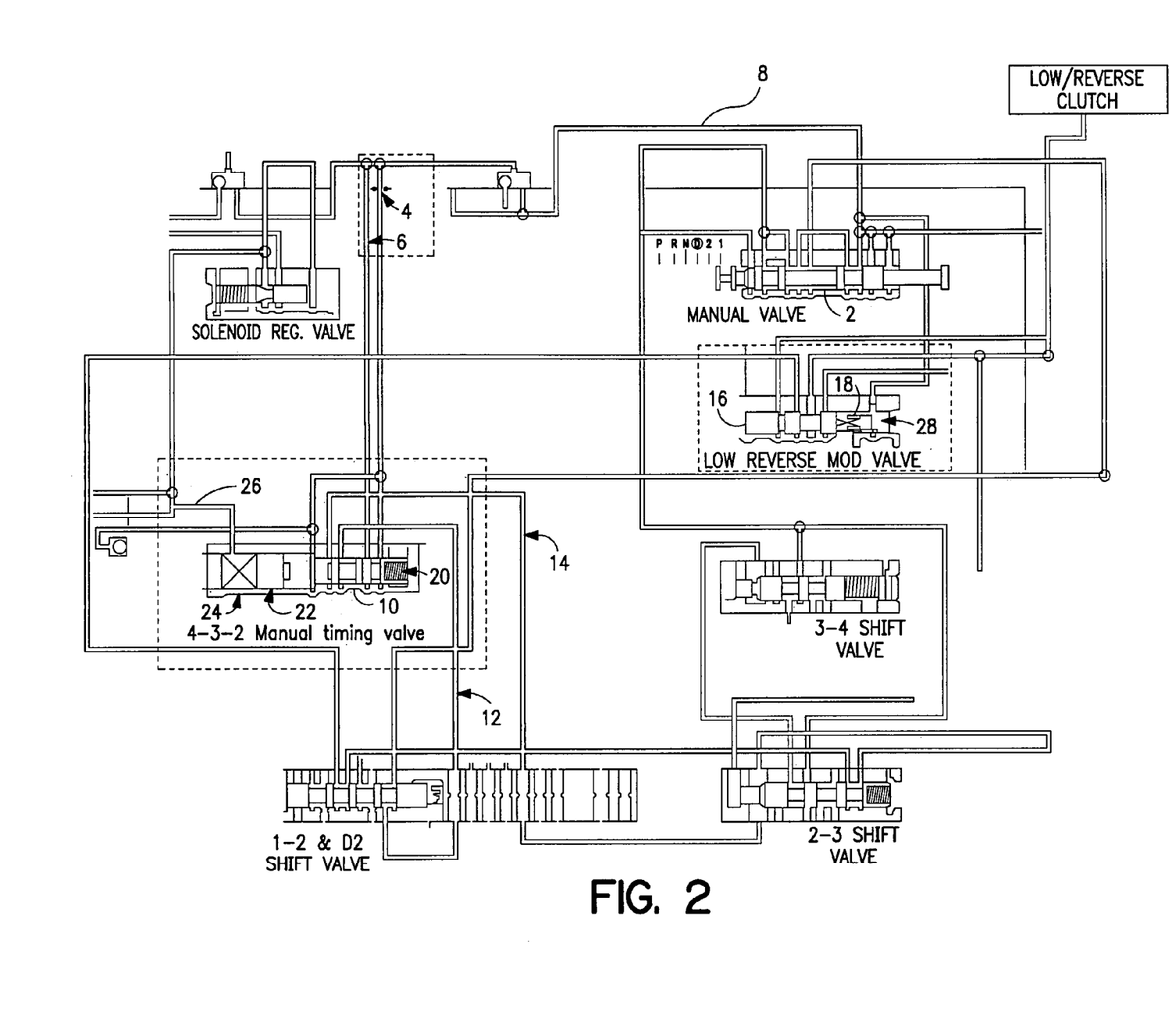
FIG. 2 illustrates a portion of the hydraulic circuitry of FIG. 1 showing the modifications in greater detail.

FIG. 1 of the drawing illustrates the hydraulic system of a "factory installed" 4R100 automotive transmission, as modified in accordance with one aspect of the present invention. FIG. 2 illustrates a portion of the hydraulic circuitry illustrated in FIG. 1, showing the modifications made to the hydraulic circuitry in greater detail. Although the following discussion of modifications to the hydraulic circuitry of a "factory installed" transmission refers primarily to the 4R100 automotive transmission installed in vehicles produced by the Ford Motor Company, the discussion is equally applicable to modifications to the E40D automotive transmission also installed in vehicles produced by the Ford Motor Company.

The hydraulic circuitry of the automotive transmission illustrated by FIGS. 1 and 2 of the drawing includes a manual valve designated by reference numeral 2. When manual low gear is selected by the driver of the vehicle at relatively high road speeds, the manual valve 2 feeds main line oil pressure to fluid flow passageways designated by reference numerals 4 and 6. The manual valve 2 is in fluid communication with the passageways 4 and 6 by a fluid flow channel designated by reference numeral 8. Fluid flow passageway 6 permits full flow of fluid therethrough, while fluid flow passageway 4 has a restricted diameter (0.056 inches in the "factory installed" transmission) for restricting fluid flow through this passageway.

Both fluid flow passageways 4 and 6 are coupled in fluid communication to a 4-3-2 manual timing valve generally designated by reference numeral 10. A fluid flow passageway, designated generally by reference numeral 12, couples the manual timing valve 10 in fluid communication with the manual valve 2. A fluid flow passageway, designated by the reference numeral 14, couples the manual timing valve 10 in fluid communication with a low and reverse modulator valve designated generally by reference numeral 16.

When the manual timing valve 10 is in its most leftward position as viewed in FIGS. 1 and 2 of the drawing, the fluid flow passageways 12 and 14 are coupled in fluid communication to each other through the manual timing valve 10, and fluid is fed to the low and reverse modulator valve through the channel 14. As noted above, full main line pressure is applied to the manual timing valve 10 through fluid flow passageway 6, while restricted flow of main line pressure is applied to the manual timing valve 10 through fluid flow passageway 4. In the "factory installed" transmission, both the full main line pressure through passageway 6, and the restricted main line pressure through passageway 4, are simultaneously applied to the manual timing valve 10. As such, full main line pressure is applied to the low and reverse modulator valve 16 through the channel 14 coupling the manual timing valve 10 and the low and reverse modulator valve 16, without regard to the position of the manual timing valve 10. The diameter of a boost valve, designated by reference numeral 18 and positioned at the right end of the low and reverse modulator valve 16 as viewed in FIGS. 1 and 2, regulates the low and reverse clutch fluid pressure applied by the low and reverse modulator valve to the low and reverse clutches. In the "factory installed" transmission, the boost valve diameter is selected to regulate the low and reverse clutch pressure to 30 psi. Therefore, in the "factory installed" transmission, the low and reverse clutches are fed with a fluid pressure of 30 psi at all times, without regard to the position of the manual timing valve 10, when the driver of the vehicle moves the manual valve to select a manual low gear position. The result is that the low and reverse clutches of the "factory installed" transmission are abruptly applied, and the maximum pressure applied is relatively low and adversely affects the holding ability of the low and reverse clutches. This, in turn, adversely affects the operation of the vehicle when, for example, the transmission is shifted into a manual low gear position to slow the vehicle when the vehicle is descending downhill, which may cause the low and reverse clutches to rapidly fail. Additionally, the abrupt application of the low and reverse clutches when the transmission is shifted into a manual low gear when the vehicle is travelling at relatively high road speeds can result in skidding, while the application of the low and reverse clutches too slowly may result in a free-wheeling or neutral condition of the vehicle.

In accordance with one aspect of the present invention, the "factory installed" hydraulic circuitry of the automotive transmission is modified to quickly but smoothly apply the low and reverse clutches when the driver of the vehicle selects a manual low gear position when the vehicle is travelling at a relatively high road speed. The modifications to the "factory installed" transmission also increase the capacity or holding ability of the low and reverse clutches by increasing the maximum apply pressure generated by the low and reverse modulator valve. These results are accomplished by modifying the hydraulic circuitry of the "factory installed" transmission in the manner discussed as follows.

In accordance with the present invention, a new manual timing valve 10, which replaces the manual timing valve of the "factory installed" transmission, includes an additional land which blocks flow of fluid through passageway 6 once a pressure of 48 psi is applied to the manual timing valve 10 through passageway 4. When fluid flow through passageway 6 is blocked, only the reduced flow of fluid through passageway 4 is applied to the low and reverse modulator valve 16 through fluid flow channel 14. This produces a gradual (non-abrupt) but firm application of fluid to the low and reverse modulator valve 16, which in turn results in a smooth application of the low and reverse modulator clutch.

In operation of the modified transmission, fluid flow through passageway 4 applies a fluid pressure to the left end of the new manual timing valve 10, forcing it in a rightward direction, as viewed in FIGS. 1 and 2, against a return spring designated by reference numeral 20. The initial fluid flow through passageway 4 also moves an accumulator piston, designated by reference numeral 22, leftward as viewed in FIGS. 1 and 2, against a return spring designated by reference numeral 24. Moreover, a new passageway designated by reference numeral 26 is provided to apply supplemental fluid pressure to the left side of the accumulator piston 22, to supplement the force of the return spring 24 acting on the left side of the accumulator piston 22 as viewed in FIGS. 1 and 2. Fluid flow through the passageway 26 is controlled by a solenoid (not shown).

When the fluid pressure applied to the manual timing valve 10 through fluid flow passageway 4 reaches 48 psi, the manual timing valve 10 is moved into a position in which the land added to the manual timing valve 10 blocks the outlet of fluid flow passageway 6 to cut-off any further pressure applied to the manual timing valve 10 through passageway 6. Thereafter, all fluid pressure applied to the manual timing valve 10 is from fluid flowing exclusively through passageway 4, which as noted above, is reduced in diameter to reduce fluid flow therethrough. The reduced fluid flow through passageway 4 is applied, through the manual timing valve 10 and the fluid flow channel 14, to the low and reverse modulator valve 16, until maximum applied pressure has been achieved. By cutting off the full fluid flow from passageway 6 after a predetermined fluid pressure applied to the manual timing valve 10 has been achieved, further pressure applied to the manual timing valve exclusively through the reduced diameter passageway 4 results in a firm but gradual (non-abrupt) application of fluid pressure to the low and reverse modulator valve 16 through the manual timing valve 10 and the fluid flow channel 14. This, in turn, results in a firm but gradual application of the low and reverse modulator clutches, which avoids a skidding condition which might occur if a vehicle is shifted into manual low gear at a relatively high road speed, or a free-wheeling or neutral condition which might occur if the vehicle is shifted into manual low gear too slowly. The firm, continuous and non-abrupt application of fluid pressure to the low and reverse modulator valve 16 avoids these two extreme conditions.

The characteristics of the return spring 20 of the manual timing valve 10, the return spring 24 of the accumulator piston 22, and the fluid pressure applied to the left end of the accumulator piston through fluid flow passageway 26, are selected to cooperate with each other to assure that the fluid pressure applied to the low and reverse modulator valve through the manual timing valve is firm, continuous and non-abrupt. It is apparent that the rate at which fluid pressure is applied to the low and reverse modulator valve 16 through the manual timing valve 10, and the maximum fluid pressure applied, are adjustable by adjusting the characteristic of the return spring 20, and/or the characteristic of the return spring 24, and/or the fluid pressure applied to the accumulator piston 22 through the passageway 26.

As discussed above, the "factory installed" transmission is designed to apply a maximum pressure of 30 psi to the low and reverse clutch. In accordance with a further aspect of the present invention, the "factory installed" transmission is modified so that a maximum fluid pressure of 80 psi is applied to the low and reverse clutch. This modification is accomplished by replacing the "factory installed" boost valve acting on the right side of the low and reverse modulator valve 16 as viewed in FIGS. 1 and 2, with a larger diameter boost valve designated by reference numeral 28. The boost valve 28 acts on the low and reverse modulator valve 16 through a spring 18 disposed therebetween. The diameter of the boost valve controls the maximum pressure applied by the low and reverse modulator valve 16 to the low and reverse clutch. By replacing the "factory installed" boost valve with a larger diameter boost valve, the maximum pressure applied to the low and reverse modulator valve 16 through the manual timing valve 10 is increased. Preferably, in accordance with the modifications to the "factory installed" transmission made by the present invention, the maximum fluid pressure applied to the low and reverse modulator valve, and therefore, the maximum fluid pressure applied to the low and reverse clutch, is 80 psi. This is a significant increase over the maximum pressure applied to the low and reverse clutch by the "factory installed" transmission, which is 30 psi. As a result of the increase of maximum apply pressure to the low and reverse clutch, the holding capacity of the low and reverse clutch is increased, thereby enabling the driver of a vehicle to select manual low gear to slow the vehicle, when, for example, the vehicle is descending downhill, without resulting in failure or burnout of the low and reverse clutches.

As a result of the modifications to the "factory installed" transmission as discussed above, the new manual timing valve feeds full main line pressure to the low and reverse modulator valve 16 until a predetermined fluid pressure (e.g., 48 psi) is applied to the manual timing valve, after which the pressure applied to the manual timing valve is exclusively from a reduced flow passageway, resulting in a smooth, continuous and non-abrupt application of fluid pressure to the low and reverse modulator valve through the manual timing valve. The boost modulator valve 28 acting on the right end of the low and reverse modulator valve 16 through the spring 18 is increased in diameter to apply a greater maximum pressure to the low and reverse modulator valve (e.g. 80 psi) than is possible with the "factory installed" transmission. The reverse and modulator clutches are therefore applied firmly, but gradually, as a result of the gradual increase in fluid pressure applied to the lower and reverse modulator valve, until the new maximum fluid pressure is attained. In this manner, skidding and freewheeling conditions of the vehicle are avoided when the driver selects manual low gear at relatively high road speeds, and the holding ability of the low and reverse clutches is increased as a result of the significant increase to the maximum apply pressure thereby preventing burnout and failure of the low and reverse clutches when manual low gear is selected to slow a moving vehicle.

Figure 3:
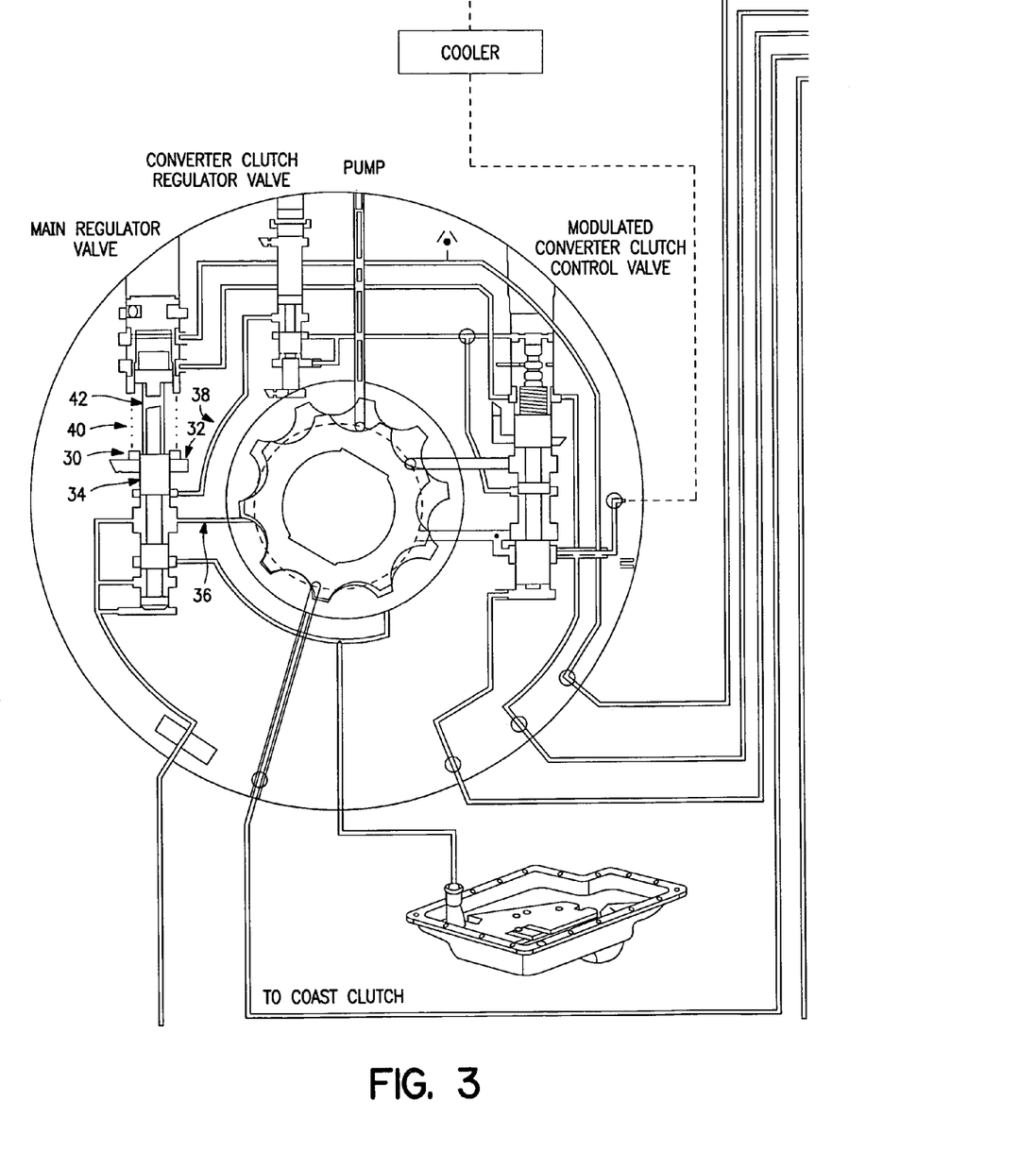
FIG. 3 illustrates a portion of the hydraulic circuitry of a "factory installed" 4R100 automotive transmission showing further modifications made to the main regulator valve in accordance with the present invention.

FIG. 3 illustrates a further modification to the "factory installed" 4R100 and E40D automotive transmission in accordance with the present invention. The "factory installed" transmission is designed so that pump pressure must exceed a value of 75 psi to open a pressure regulator valve necessary to feed the torque converter and cooler/lubrication circuits. When the transmission is relatively new, the hydraulic system has no difficulty in achieving the required threshold pressure to feed the torque end cooler/lubrication circuits. However, when the transmission is older and parts become warped or worn, and leaks develop, it becomes more difficult for the hydraulic circuitry to achieve the required threshold pressure of 75 psi to open the pressure regulator valve. This problem becomes particularly serious at hot and slow engine/pump speeds when the pump cannot supply sufficient fluid pressure to overcome leaks in the system to achieve the necessary 75 psi threshold pressure to open the pressure regulator valve to feed oil to the torque converter and cooler/lubrication circuits. As a result, the converter and lubrication pressure falls to zero, resulting in converter failure, as well as transmission, bushing and gear failure resulting from lack of lubrication.

In accordance with a further aspect of the present invention, the "factory installed" 4R100 and E40D automotive transmissions are modified to significantly reduce the threshold pressure necessary to open the pressure regulator valve to feed the torque converter and cooler/lubrication circuits. In this manner, the pump output is capable of generating the necessary output pressure to open the pressure regulator valve to feed the torque converter and cooler/lubrication circuits, notwithstanding worn components or leaks in the hydraulic circuitry of the transmission.

FIG. 3 illustrates a new spring seat designated by reference numeral 30 mounted on a casting designated by reference numeral 32. The pressure regulator valve, designated by reference numeral 34, is movable upwardly as seen in FIG. 3, to connect a first fluid circuit designated by reference numeral 36, with a second fluid circuit designated by reference numeral 38. The circuits 36 and 38, in the modified transmission, are connected to each other in fluid flow relationship, as a result of upward movement of a distance of about 0.015 inches by the pressure regulator valve, before the top surface of the valve engages the seat 30 which precludes any further upward movement of the valve 34. The necessary movement of the pressure regulator valve to couple the circuits 36 and 38 occurs when the outlet pump pressure applied to the pressure regulator valve is approximately 15 psi. This pressure is readily achieved by the hydraulic circuitry, notwithstanding any leaks or worn components which otherwise diminish the outlet pump pressure applied to the pressure regulator valve in the "factory installed" transmission. Once the pressure regulator valve is moved into engagement with the seat 30 to connect circuits 36 and 38, the pressure available from the pump outlet applied to the pressure regulator valve is regulated by an outer spring designated by reference numeral 40, the lower end of which is supported by the upper surface of the seat 30. The relationship between the seat 30 and the outer spring 40 assures that the first 15 psi of pressure generated by the pump is dedicated exclusively to connecting the circuits 36 and 38 to feed oil to the torque converter and the cooler/lubrication circuits. When the vehicle engine is turned off and the pump no longer generates output pressure applied to the lower end of the pressure regulator valve 34 to move the valve in an upward direction, an inner spring designated by reference numeral 42 acts on the top surface of the pressure regulator valve 34 to move it in a downward direction to block circuits 36 and 38. In this manner, the fluids in circuits 36 and 38 will remain in the circuits and not drain back into a lower pan, which would result in delay in feeding the torque converter and cooler/lubrication circuits when the vehicle engine is turned on and the transmission is back in operation.

The modifications to the hydraulic circuitry of the "factory installed" transmission, as discussed with respect to FIG. 3, prevents converter bushing and gear failure of the transmission resulting from lack of lubrication by modifying the hydraulic circuitry of the "factory installed" transmission to feed the torque converter and cooler/lubrication circuits with oil at a significantly lower pressure than required by the "factory installed" transmission. In this manner, the necessary threshold pressure is generated notwithstanding leaks in the hydraulic circuitry and worn components which might otherwise prevent the "factory installed" transmission from attaining the necessary fluid pressure to feed the torque converter and cooler/lubrication circuits of the hydraulic circuitry of the automotive transmission.

Other variations and modifications of the embodiments of the invention discussed herein will become apparent to those skilled in the art. Accordingly, the description of the preferred embodiments are intended to be illustrative only, but not restrictive of the scope of the invention, that scope being defined by the following claims and all equivalents thereto.

The invention claimed is:

1. A method for modifying the hydraulic circuitry of a factory installed automotive transmission of the type including a pressure regulator valve in fluid communication with the outlet of a pump for moving said pressure regulator valve in a first predetermined direction, said pressure regulator valve operatively associated with two circuits such that said two circuits are coupled together in fluid flow relationship when a predetermined pressure is applied to said pressure regulator valve to move said pressure regulator valve a predetermined distance;

said method comprising the step of decreasing the value of said predetermined pressure applied to said pressure regulator valve necessary to move said pressure regulator valve said predetermined distance for coupling said two circuits in fluid flow relationship;

said method further including the step of moving the pressure regulator valve in its entirety to block said two circuits to prevent draining of fluid from said two circuits when the engine of the motor vehicle in which said automotive transmission is installed is turned off.

2. The method as claimed in claim 1, wherein the step of decreasing the value of said predetermined pressure includes the step of providing a seat for engaging the pressure regulator valve for controlling the distance moved by said pressure regulator valve for coupling said two circuits in fluid flow relationship.

3. The method as claimed in claim 2, further including the step of applying a resilient force to said pressure regulator valve through said seat for adjusting the predetermined pressure applied to said pressure regulator valve necessary to move said pressure regulator valve said predetermined distance for coupling said two circuits in fluid flow relationship.

4. The method as claimed in claim 1, wherein said step of moving includes the step of exerting a resilient force on an outside surface of said pressure regulator valve to move said pressure regulator valve in a direction to block said two circuits.

* * * * *